United States Patent Office 2,762,785
Patented Sept. 11, 1956

2,762,785

CEMENTS COMPRISING AN AQUEOUS SOLUTION OF AN ALKALI METAL SILICATE AND A POLYSILOXANE WHICH CONTAINS HYDROCARBONOXY GROUPS

Ronald H. Cooper, Clare County, Mich., assignor to The Dow Chemical Company, Midland, Mich., a corporation of Delaware No Drawing. Application March 8, 1954,
Serial No. 414,896

5 Claims. (Cl. 260—29.2)

This invention relates to improved silicate cements containing certain organosilicon compounds.

Aqueous silicate solutions particularly those of sodium and potassium silicates have long been used for acid resistant cements. They have the advantage of being comparatively durable to aqueous acids and also of being reasonably cheap. However, the term "acid resistant" is a relative term and in practice the silicate cements do deteriorate with time when subjected to aqueous acids such as is often encountered in chemical processes. The problem is further aggravated by the fact that the best acid resistant cements are obtained by employing cement solution of the range of 38° Baumé which have a high ratio of filler to silicate solution. However, these more acid resistant compositions are difficult to trowel. Consequently, the masons employing such cements invariably tend to dilute them with water to give a lower Baumé solution or to decrease the ratio of filler to silicate solution thereby giving a more fluid mix. When either of these two things happens the acid resistance of the cement is substantially lowered.

It is an object of this invention to obviate the above difficulties by producing a smooth trowelable silicate cement mix which upon curing has a high tensile strength, low acid and water absorption, a low loss intensile strength when exposed to acid and water solutions and excellent adherence to brick, ceramics, carbon and graphite under both dry and humid conditions. These objectives are accomplished with the compositions described hereinafter.

This invention relates to an acid resistant cement consisting essentially of a water-glass solution and from 3 to 30% by weight based on the weight of the alkali metal silicate in the water-glass solution, of an aliphatic hydrocarbonoxy substituted siloxane in which at least a major portion of the silicon atoms are connected by SiOSi linkages and any remaining linkages are of the type SiSi and/or SiR'Si where R' is a divalent hydrocarbon radical. The remaining valences of the silicon atoms in the siloxane are satisfied with monovalent hydrocarbon radicals in the amount of on the average from 1 to 1.5 said radicals per silicon atom and radicals of the formula OR" in which R" is an aliphatic hydrocarbon radical. The latter radicals are present in the amount of on the average from .03 to 2 OR" radicals per silicon atom. In the siloxane the sum of the average number of hydrocarbon radicals and the OR" radicals is not greater than 3.

Organosilicon compounds which are operative in this invention are aliphatic hydrocarbonoxy substituted siloxanes. It has been found that this type of siloxane is particularly adaptable for use in connection with silicate cements. Quite surprisingly the alkali metal salts of the corresponding siloxanes show no substantial improvement over silicate cement containing no organosilicon compound. For the purpose of this invention all of the silicon atoms in the hydrocarbonoxy siloxanes of this invention can be connected through SiOSi linkages. In such cases the siloxanes would have the general formula

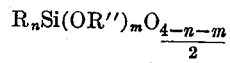

where R is a monovalent hydrocarbon radical, R" is as above defined and $n$ and $m$ have the values 1 to 1.5 and .03 to 2 respectively. Such compounds are commercially available and are known in the art as partially hydrolyzed hydrocarbonoxy siloxanes. They are best prepared, for example, by partially alkoxylating the corresponding halosilanes and thereafter adding sufficient water to the resulting haloalkoxy compound in order to hydrolyze the halogen thereby producing the alkoxylated siloxane.

If desired, the siloxanes employed herein may be those in which a majority of the silicon atoms are linked by SiOSi linkages and the remaining silicon atoms are linked either by SiSi linkages or SiR'Si linkages or both. Aliphatic hydrocarbonoxy substituted siloxanes containing combinations of the above three types of linkages are commercially available. For example, one which contains all three is prepared by partially alkoxylating the so-called "direct process" residue by reacting the residue with the desired alcohol. The direct process residue is obtained by reacting methyl chloride with silicon and thereafter removing methylchlorosilanes boiling below 75° C. at atmospheric pressure. This residue is more fully described in the copending applications of Arthur J. Barry et al., Serial No. 338,123, filed February 20, 1953, and John W. Gilkey, Serial No. 357,921, filed May 27, 1953. The partially alkoxylated residue is partially hydrolyzed by adding enough water to remove the chlorine from the silicon. The resulting product is a complex material containing silicon bonded alkoxy groups.

Although the use of completely hydrolyzed siloxanes alone is not within the scope of this invention nevertheless a minor amount of such siloxanes can be mixed with the alkoxysiloxanes and the mixture incorporated in silicate cements. The term "completely hydrolyzed" siloxanes means siloxanes which contain no substantial amount of hydrolyzable groups such as hydrocarbonoxy groups. The term "minor amount" means that the completely hydrolyzed siloxane is present in amount less than 50% by weight of the total weight of the organosiloxane composition. Completely hydrolyzed siloxanes have the unit formula

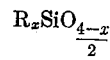

where R is as above defined and $x$ has an average value of from 1 to 2.

For the purpose of this invention the R groups attached to the silicon can be any monovalent hydrocarbon radical such as for example methyl, ethyl, octadecyl, vinyl, allyl, cyclohexyl, cyclopentyl, cyclohexenyl, tolyl, benzyl, phenyl, xenyl and naphthyl, R' can be any divalent hydrocarbon radical such as methylene, ethylene, butylene, phenylene and xenylene. R" can be any aliphatic hydrocarbon radical such as methyl, ethyl, propyl, isopropyl, butyl, octadecyl, vinyl, allyl and cyclohexyl. Preferably R" should contain less than 6 carbon atoms.

The silicates employed in this invention are aqueous solutions of sodium and potassium silicates commercially known as water-glass. For the purpose of this invention the concentration of these solutions can be varied to give the desired consistency and setting time. Typical concentrations which are normally present in commercial silicate solutions are those in which the specific gravity of the solution ranges from 1.325 to 1.355. Normally the ratio by weight of alkali metal oxide to $SiO_2$ will be of the order of 1:3 to 1:3.5. It should be understood that the above ranges are merely exemplatory and that the compositions of this invention are in no way limited thereto.

The amount of organosilicon compound relative to the amount of silicate in the cement can be varied from 3 to 30% based on the weight of the alkali metal silicate in the water-glass solution. In general, particularly when fillers are employed in the cement, the amount of organosilicon compound will range from .5 to 3% of the overall composition (i. e., water-glass solution plus filler plus organosiloxane).

If desired, fillers may be employed in the cements of this invention. Suitable fillers are siliceous materials such as silex, diatomaceous earth, sand and the like. The amount of filler employed will depend upon the consistency desired in the cement mix. In general, the amount of filler will vary from 50 to 75% of the total weight of the cement.

The compositions of this invention are particularly useful for cementing materials in contact with aqueous acids.

The following examples are illustrative only and should not be construed as limiting the invention which is properly delineated in the appended claims.

$SiO_2$, 1.42% aluminum oxide, 4% sodium fluorosilicate, 2.91% volatiles and the remainder being traces of iron, calcium and magnesium oxides.

In preparation of the cement the organosiloxane was added to the sodium silicate solution with continuous stirring until a homogenous dispersion was obtained. The filler was then gradually added with stirring until a smooth mix was formed. The resulting mix was poured into a figure 8 briquette mold and allowed to harden for at least 24 hours before removing therefrom. The briquettes were then aged under the conditions shown in the table below and the properties thereof determined as shown.

In the table runs 1 to 12 pertain to compositions within the scope of this invention, 13 gives average values for a total of 10 cements prepared with the same waterglass and filler but omitting the siloxane, run 14 shows the average values obtained from 7 runs employing the same silicate solution and filler but using a sodium salt of siloxane A which contained about 1.1 sodium atoms per silicon and no methoxy groups.

| | Composition of cement in percent by wt. based on total composition [1] | | | Tensile strength in p. s. i. after 30 days' air drying | After 30 days in 20% HCl at 110° C. | | | After 30 days in distilled water at 100° C. | | |
|---|---|---|---|---|---|---|---|---|---|---|
| | Filler | Na silicate solution | Siloxane | | Percent wt. gain | Tensile in p. s. i. | Penetration | Percent wt. gain | Tensile in p. s. i. | Penetration |
| 1 | 70.70 | 28.30 | .90 | 500 | 10.79 | 450 | Partial | 6.38 | 438 | Partial. |
| 2 | 70.70 | 27.10 | 2.00 | 445 | 15.10 | 452 | do | 8.30 | 493 | Do. |
| 3 | 70.00 | 27.00 | 2.40 | 477 | 13.00 | 470 | do | | | Partial. |
| 4 | 68.85 | 29.15 | .90 | 480 | 9.90 | 550 | do | 6.10 | 425 | Do. |
| 5 | 69.20 | 28.80 | 1.80 | 360 | 11.20 | 500 | do | 3.68 | 528 | Do. |
| 6 | 69.10 | 28.90 | 1.60 | 490 | 14.30 | 465 | do | 9.54 | 385 | Do. |
| 7 | 68.10 | 30.90 | .90 | 590 | 10.34 | 508 | do | 3.30 | 507 | Do. |
| 8 | 68.10 | 30.75 | 1.03 | 538 | 9.56 | 475 | do | 5.67 | 380 | Do. |
| 9 | 66.00 | 33.00 | .90 | 452 | 13.50 | 545 | do | 3.70 | 370 | Do. |
| 10 | 65.30 | 32.70 | 1.80 | 385 | 9.69 | 656 | do | 6.70 | 395 | Do. |
| 11 | 67.75 | 30.75 | 1.20 | 505 | 13.35 | 460 | do | 8.54 | 410 | Do. |
| 12 | 56.55 | 41.20 | 2.92 | 493 | 10.90 | 552 | do | 7.36 | 450 | Do. |
| Average | | | | 535 | 11.80 | 503 | | 5.8 | 435 | |
| 13 | | | | 363 | 18.4 | 376 | Complete | 15.5 | 335 | Complete. |
| 14 | | | | 300 | 18.6 | 367 | do | 15.5 | 271 | Varied. |

[1] The difference between the total percentages and 100% represents the amount of toluene in the siloxane.

Example 1

The siloxane employed in the experiments of this example was a mixture of (A) 85% by weight of a fluid alkoxylated polysiloxane and (B) 15% by weight of a nonalkoxylated polysiloxane resin. Siloxane A had an average of about 1.1 total monovalent hydrocarbon radicals per silicon atom (said radicals being methyl, ethyl, propyl, and butyl) and 24% by weight silicon bonded methoxy groups. A major proportion of the silicon atoms in this siloxane were linked through SiOSi linkages and a minor proportion of the silicon atoms were linked through SiSi linkages and SiR'Si linkages in which R' was methylene or ethylene. This siloxane was prepared from the direct process residue by the method described supra.

Siloxane B was a copolymer composed of $SiO_2$ and $Me_3SiO_{.5}$ units in which there was an average of about 1.2 methyl groups per silicon atom. This siloxane was benzene soluble and all of the polymer linkages therein were SiOSi linkages.

The water-glass employed in this invention was an aqueous solution of sodium silicate having a specific gravity of about 1.355 or 38° Baumé. The sodium silicate was composed of about one part by weight $Na_2O$ to 3.20 parts by weight $SiO_2$. This sodium silicate was diluted to give a solution having a specific gravity of 1.353 which contains about 37% by weight solids, i. e., $Na_2O + SiO_2$.

The filler employed was a powdered silica having the following composition in per cent by weight: 92.4%

Example 2

Equivalent results are obtained when a siloxane having the composition 67 mol per cent phenylmethylsiloxane and 33 mol per cent monophenylsiloxane and containing 20% by weight silicon bonded isopropoxy groups, is employed in the procedure of Example 1.

Example 3

Equivalent results are obtained when an aqueous solution of potassium silicate having a composition equivalent to the silicate solution of Example 1, is employed in the process of that example.

That which is claimed is:

1. An acid resistant cement consisting essentially of an aqueous water-glass solution and from 3 to 30% by weight based on the weight of the alkali metal silicate in the water-glass solution of an aliphatic hydrocarbonoxy substituted siloxane in which at least a major portion of the silicon atoms are connected by SiOSi linkages and any remaining linkages are selected from the group consisting of SiSi and SiR'Si linkages where R' is a divalent hydrocarbon radical, the remaining valences of the silicon atoms in said siloxane being satisfied by monovalent hydrocarbon radicals in the amount of on the average from 1 to 1.5 said radicals per silicon atom and radicals of the formula OR'' in which R'' is an aliphatic hydrocarbon radical, in amount of on the average from .03 to 2 OR'' radicals per silicon atom.

2. An acid resistant cement consisting essentially of an aqueous water-glass solution, a filler and from 3 to 30% by weight based on the weight of the alkali metal silicate in the water-glass solution of an aliphatic hydrocarbonoxy substituted siloxane in which at least a major portion of the silicon atoms are connected by SiOSi linkages and any remaining linkages are selected from the group consisting of SiSi and SiR'Si linkages where R' is a divalent hydrocarbon radical, the remaining valences of the silicon atoms in said siloxane being satisfied with monovalent hydrocarbon radicals in the amount of on the average from 1 to 1.5 said radicals per silicon atom and radicals of the formula OR'' in which R'' is an aliphatic hydrocarbon radical, in amount of on the average from .03 to 2 OR'' radicals per silicon atom.

3. An acid resistant cement consisting essentially of an aqueous water-glass solution, a filler and from 3 to 30% by weight based on the weight of the alkali metal silicate in the water-glass solution of a siloxane composed of a mixture of (A) an aliphatic hydrocarbonoxy substituted siloxane in which at least a major portion of the silicon atoms are connected by SiOSi linkages, any remaining linkages being selected from the group consisting of SiSi and SiR'Si where R' is a divalent hydrocarbon radical, the remaining valences of the silicon atoms in siloxane A being satisfied with monovalent hydrocarbon radicals in amount of on the average from 1 to 1.5 said radicals per silicon atom and radicals of the formula OR'' in which R'' is an aliphatic hydrocarbon radical, in amount of on the average from .03 to 2 OR'' radicals per silicon atom and (B) less than 50% by weight based on the total weight of the siloxanes of a siloxane of the formula $$R_xSiO_{\frac{4-x}{2}}$$

where R is a monovalent hydrocarbon radical and $x$ has an average value of from 1 to 2.

4. An acid resistant cement comprising an aqueous sodium silicate solution, a filler and from 3 to 30% by weight based on the weight of the sodium silicate in the aqueous solution of a siloxane in which at least a major portion of the silicon atoms are connected by SiOSi linkages and any remaining linkages are selected from the group consisting of SiSi and SiR'Si where R' is selected from the group consisting of methylene and ethylene radicals, the remaining valences of the silicon atoms in the siloxane being satisfied by radicals selected from the group consisting of alkyl and phenyl radicals in the amount of on the average from 1 to 1.5 said radicals per silicon atom and alkoxy radicals containing less than 6 carbon atoms in the amount of from .03 to 2 alkoxy radicals per silicon atom.

5. An acid resistant cement consisting essentially of an aqueous sodium silicate solution, a filler and from 3 to 30% by weight based on the weight of the sodium silicate in the aqueous solution of a siloxane composed of a mixture of (A) a siloxane in which a major proportion of the silicon atoms are connected by SiOSi linkages, the remaining linkages being SiSi and SiR'Si linkages where R' is selected from the group consisting of methylene and ethylene radicals, the remaining valences of the silicon atoms in siloxane A being satisfied with monovalent hydrocarbon radicals selected from the group consisting of methyl, ethyl, propyl and butyl radicals, said radicals being present in the amount of on the average from 1 to 1.5 radicals per silicon atom, and alkoxy radicals containing less than 6 carbon atoms in amount of on the average from .03 to 2 alkoxy radicals per silicon atom and (B) less than 50% by weight based on the weight of the total siloxane mixture of a siloxane of the formula $(CH_3)_xSiO_{4-x}$ in which $x$ has an average value of from 1 to 2 inclusive.

References Cited in the file of this patent
UNITED STATES PATENTS
2,588,828    Greiner _____ Mar. 11, 1952